(12) United States Patent
Liu

(10) Patent No.: US 12,128,312 B2
(45) Date of Patent: *Oct. 29, 2024

(54) METHOD AND APPARATUS FOR PROMPTING THAT VIRTUAL OBJECT IS ATTACKED, TERMINAL, AND STORAGE MEDIUM

(71) Applicant: Tencent Technology (Shenzhen) Company Limited, Shenzhen (CN)

(72) Inventor: Zhi Hong Liu, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 1 day.

This patent is subject to a terminal disclaimer.

(21) Appl. No.: 18/153,048

(22) Filed: Jan. 11, 2023

(65) Prior Publication Data

US 2023/0141406 A1    May 11, 2023

Related U.S. Application Data

(63) Continuation of application No. 17/156,138, filed on Jan. 22, 2021, now Pat. No. 11,577,171, which is a
(Continued)

(30) Foreign Application Priority Data

Sep. 5, 2019    (CN) .......................... 201910838705.3

(51) Int. Cl.
*A63F 13/58*    (2014.01)
*G06F 3/0488*    (2022.01)

(52) U.S. Cl.
CPC ............ *A63F 13/58* (2014.09); *G06F 3/0488* (2013.01)

(58) Field of Classification Search
CPC ......... A63F 13/52; A63F 13/537; A63F 13/58
See application file for complete search history.

(56) References Cited

U.S. PATENT DOCUMENTS

2007/0265091 A1    11/2007    Aguilar et al.
2007/0298886 A1    12/2007    Aguilar et al.
(Continued)

FOREIGN PATENT DOCUMENTS

| CN | 107638692 A | 1/2018 |
| CN | 110075523 A | 8/2019 |

(Continued)

OTHER PUBLICATIONS

International Search Report and Written Opinion received for Application No. PCT/CN2020/111851 mailed Dec. 2, 2020 (English and Chinese languages) (11 pages).
(Continued)

*Primary Examiner* — Jay Trent Liddle
(74) *Attorney, Agent, or Firm* — Crowell & Moring LLP

(57) ABSTRACT

A method and an apparatus includes prompting that a virtual object is attacked. The method includes: displaying a user interface (UI) including a target virtual object located in a virtual environment. A being-attacked direction of the target virtual object is obtained. A display position of the being-attacked direction prompt information is obtained according to the being-attacked direction. The being-attacked direction prompt information is used for indicating the being-attacked direction. The being-attacked direction prompt information is displayed in the UI according to the display position. The being-attacked direction is prompted, and content of the being-attacked prompt is diversified.

20 Claims, 12 Drawing Sheets

Related U.S. Application Data continuation of application No. PCT/CN2020/111851, filed on Aug. 27, 2020.

(56) References Cited

U.S. PATENT DOCUMENTS

| | | | |
|---|---|---|---|
| 2010/0267451 | A1 | 10/2010 | Kawano et al. |
| 2012/0306750 | A1 | 12/2012 | Karasin et al. |
| 2013/0116019 | A1 | 5/2013 | Kawano et al. |
| 2019/0099667 | A1 | 4/2019 | Chida |
| 2019/0227977 | A1 | 7/2019 | Delaet et al. |
| 2020/0338453 | A1 | 10/2020 | Lee et al. |
| 2021/0339138 | A1 | 11/2021 | Shao et al. |
| 2022/0193550 | A1 | 6/2022 | Wang et al. |

FOREIGN PATENT DOCUMENTS

| | | |
|---|---|---|
| CN | 110548288 A | 12/2019 |
| EP | 2 243 527 A2 | 10/2010 |
| JP | 05192449 A | 8/1993 |
| JP | 2007-296191 | 11/2007 |
| JP | 2010-155054 | 7/2010 |
| JP | 2010-246851 | 11/2010 |
| KR | 2019-0078474 A | 7/2019 |

OTHER PUBLICATIONS

Notice of Second Review Opinion for China Patent Application No. 201910838705.3 posted Jul. 10, 2020 (4 pages).
Search Report from the State Intellectual Property Office for China Application No. 201910838705.3 posted Apr. 2, 2020 (13 pages).
Bard, Canyon, Internet article, https://mz.mbd.baidu.com/r/cVTLfO1ai4?f=cp&u=53c6b671c27308, "Stimulate the Battlefield: You don't know where the enemy is when you are beaten? In addition to listening to the sound, you also need to learn these three points!," January 19, 2018 (English translation) (5 pages).
Japanese Office Action dated Oct. 17, 2022 for JP Application No. 2021-557136 (3 pp.).
Xia Gu et al., Purg Mobile : Three More Tips for Spotting Enemies, www.mz.mbd.baidu.com/r/cVTLf01ai4?=f=cp&u=53c6b671c2730825, Aug. 18, 2022 (5 pp.).
Stephenson, Jasper, "A UX Analysis of First-Person Shooter Damage Indicators," Mar. 3, 2018 available at https://medium.com/@jasper.stephenson/a-ux-analysis-of-first-person-shooter-damage-indicators-59ac9d41caf8 (Year: 2018).
TheRadBrad, "Call of Duty WW2 Walkthrough Gameplay Part 1—Normandy—Campaign Mission 1 (COD World War 2)" Nov. 2, 2017, available at https://www.youtube.com/watch?v=edvnX8TwSTI&t=1155s (Year: 2017).
ANTTI8D, "How aim punch ruins CS:GO," Nov. 29, 2012, available at https://www.youtube.com/watch?v=UUmBNluBH3g (Year: 2012).
Search Report and Written Opinion, Feb. 6, 2023, pp. 1-11, issued in Singapore Patent Application No. 11202110074W, Intellectual Property Office of Singapore, Singapore.
Machine Translation, Stimulate the battlefield, Jan. 18, 2019, pp. 1-8. May be obtained from the Wayback Machine at https://web.archive.org/web/20230130002823/https://www.sohu.com/a/289996919_99903196
Machine Translation, Internet Source, PlayerUnknown's Battlegrounds stimulates the battlefield, how to judge the enemy's position according to the prompt, Mar. 7, 2018, pp. 1-6, May be obtained from the Wayback Machine at https://web.archive.org/web/20230202091058/https://www.9game.cn/news/2204218.html
Office Action received in related Korean Patent Application No. 10-2021-7033376, dated Jun. 23, 2023, including English translation, 9 pgs.
Call of Duty WW2—Cinematic Cut, including English translation, available at: https://www.youtube.com/watch?v=Phsauxy4AWY.

METHOD AND APPARATUS FOR PROMPTING THAT VIRTUAL OBJECT IS ATTACKED, TERMINAL, AND STORAGE MEDIUM

RELATED APPLICATION

This application claims priority as a Continuation to U.S. application Ser. No. 17/156,138, entitled "METHOD AND APPARATUS FOR PROMPTING THAT VIRTUAL OBJECT IS ATTACKED, TERMINAL, AND STORAGE MEDIUM" and filed Jan. 22, 2021, which is a continuation application of PCT Patent Application No. PCT/CN2020/111851 filed on Aug. 27, 2020, which claims priority to Chinese Patent Application No. 201910838705.3, entitled "METHOD AND APPARATUS FOR PROMPTING THAT VIRTUAL OBJECT IS ATTACKED, TERMINAL, AND STORAGE MEDIUM" and filed on Sep. 5, 2019, each of which are incorporated herein by reference in their entirety.

FIELD OF THE TECHNOLOGY

Embodiments of this application relate to the field of computer and Internet technologies, and in particular, to a method and an apparatus for prompting that a virtual object is attacked, a terminal, and a storage medium.

BACKGROUND OF THE DISCLOSURE

At present, in some shooter games (STGs) at a mobile side, a virtual object controlled by a player may be attacked by other virtual objects in a game scene provided during a game battle.

In the related art, when the virtual object controlled by the player is attacked by an enemy virtual object, a client displays corresponding prompt information in a game interface, for example, displaying the interface turning red and a health point decreasing, and playing a being-attacked sound.

Current being-attacked prompts are relatively undiversified and an amount of provided information is limited.

SUMMARY

Embodiments of this application provide a method and an apparatus for prompting that a virtual object is attacked, a terminal, and a storage medium, which may be configured to resolve a technical problem in the related art that being-attacked prompts are relatively undiversified and an amount of provided information is limited. The technical solutions are as follows:

According to one embodiment of this application, a method for prompting that a virtual object is attacked, applicable to a mobile terminal, includes:
  displaying a user interface (UI), the UI including a target virtual object located in a virtual environment;
  obtaining a being-attacked direction of the target virtual object, the being-attacked direction is a direction in which the target virtual object is attacked;
  determining a display position of being-attacked direction prompt information according to the being-attacked direction, the being-attacked direction prompt information is used for indicating the being-attacked direction; and
  displaying the being-attacked direction prompt information in the UI according to the display position.

According to another embodiment of this application, a method for prompting that a virtual object is attacked, applicable to a mobile terminal, includes:
  displaying a UI, the UI including a target virtual object located in a virtual environment;
  obtaining a being-attacked direction of the target virtual object, the being-attacked direction is a direction in which the target virtual object is attacked;
  determining, according to the being-attacked direction, a jitter parameter of a virtual weapon held by the target virtual object; and
  causing, according to the jitter parameter, the virtual weapon to jitter.

According to still another embodiment of this application, an apparatus for prompting that a virtual object is attacked, includes:
  an interface display module, configured to display a UI, the UI including a target virtual object located in a virtual environment;
  a direction obtaining module, configured to obtain a being-attacked direction of the target virtual object, the being-attacked direction is a direction in which the target virtual object is attacked;
  a position determination module, configured to determine a display position of being-attacked direction prompt information according to the being-attacked direction, the being-attacked direction prompt information is used for indicating the being-attacked direction; and
  an information display module, configured to display the being-attacked direction prompt information in the UI according to the display position.

According to another embodiment of this application, an apparatus for prompting that a virtual object is attacked, includes:
  an interface display module, configured to display a UI, the UI including a target virtual object located in a virtual environment;
  a direction obtaining module, configured to obtain a being-attacked direction of the target virtual object, the being-attacked direction is a direction in which the target virtual object is attacked;
  a parameter determination module, configured to determine, according to the being-attacked direction, a jitter parameter of a virtual weapon held by the target virtual object; and
  a jitter control module, configured to cause, according to the jitter parameter, the virtual weapon to jitter.

According to another embodiment of this application, a mobile terminal, includes a processor and a memory, the memory storing at least one instruction, at least one program, a code set, or an instruction set, the at least one instruction, the at least one program, the code set, or the instruction set being loaded and executed by the processor to implement the method for prompting that a virtual object is attacked.

According to another embodiment, a computer-readable storage medium is provided, storing at least one instruction, at least one program, a code set, or an instruction set, the at least one instruction, the at least one program, the code set, or the instruction set being loaded and executed by a processor to implement the method for prompting that a virtual object is attacked.

According to another embodiment, a computer program product is provided, the computer program product, when run on a computer, causing the computer to perform the method for prompting that a virtual object is attacked.

According to the technical solutions provided in the embodiments of this application, a being-attacked direction of a virtual object is obtained, a display position of being-attacked direction prompt information is determined according to the being-attacked direction, and the being-attacked direction prompt information is displayed in a UI, to prompt the being-attacked direction. Compared with the related art in which a being-attacked prompt is used only for prompting that the virtual object is attacked, the being-attacked prompt in the embodiments of this application not only prompts that the virtual object is attacked, but also prompts the direction in which the virtual object is attacked, thereby diversifying content of the being-attacked prompt, providing more valuable information, and providing more reference for a subsequent operation of a user.

In addition, according to the embodiments of this application, after the being-attacked direction of the virtual object is obtained, a virtual weapon held by the virtual object is further controlled according to the being-attacked direction to jitter, to allow the user to perceive the attack and determine the being-attacked direction according to a jitter status of the virtual weapon, thereby prompting the being-attacked direction, diversifying content of the being-attacked prompt, and providing more valuable information. Furthermore, such a manner is more intuitive and clearer, making it easier to draw the attention of the user.

BRIEF DESCRIPTION OF THE DRAWINGS

To describe the technical solutions of the embodiments of this application more clearly, the following briefly describes the accompanying drawings required for describing the embodiments. Apparently, the accompanying drawings in the following description show merely some embodiments of this application, and a person of ordinary skill in the art may still derive other accompanying drawings according to these accompanying drawings without creative efforts.

DESCRIPTION OF EMBODIMENTS

Figure 1:
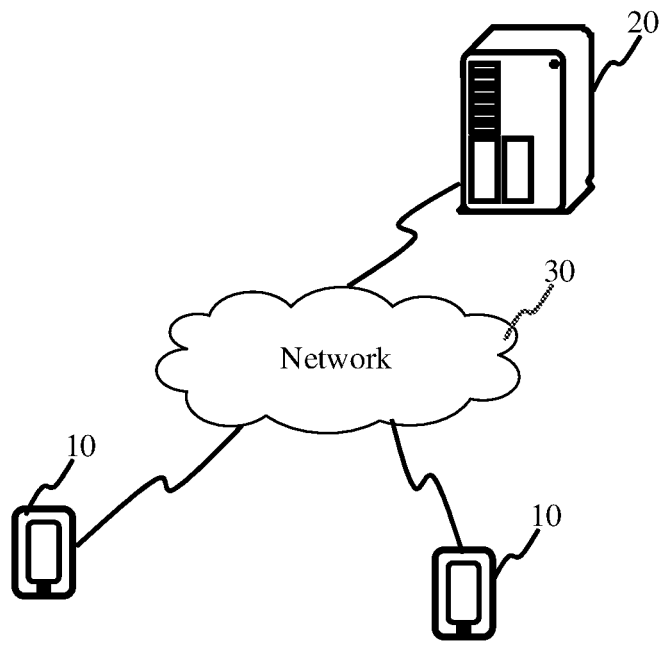
FIG. 1 is a schematic diagram of an implementation environment according to an embodiment of this application.

To make the objectives, technical solutions, and advantages of this application clearer, the following further describes implementations of this application in detail with reference to the accompanying drawings.

Before embodiments of this application are described, related terms involved in this application are explained first.

1. Virtual Scene

A virtual scene is a scene displayed (or provided) when a client of an application (such as a game application) runs on a terminal. The virtual scene refers to a scene created for a virtual object to perform activities (such as game competition). The virtual scene may be, for example, a virtual house, a virtual island, or a virtual map. The virtual scene may be a simulated scene of the real world, or may be a semi-simulated semi-fictional scene, or may be an entirely fictional scene. The virtual scene may be a two-dimensional virtual scene, a 2.5-dimensional virtual scene, or a three-dimensional virtual scene, any of which are merely example embodiments of this application.

2. Virtual Object

A virtual object is a virtual character controlled by a user account in an application. For example, the application is a game application. The virtual object is a game character controlled by the user account in the game application. The virtual object may be in a human form or animal, cartoon, or other forms, which are merely example embodiments of this application. The virtual object may be presented in a three-dimensional form or a two-dimensional form, any of which are merely example embodiments of this application.

In different game applications, operations that can be performed by the virtual object controlled by the user account may be different. For example, in an STG application, the user account may control the virtual object to perform operations such as shooting, running, jumping, gun picking up, gun replacing, and bullet loading.

Certainly, in addition to the game applications, the virtual object may also be presented to a user and provided with a corresponding function in applications of another type, for example, an augmented reality (AR) application, a social application, or an interactive entertainment application, which are merely example embodiments of this application. Besides, the form and corresponding function of the virtual object vary with different applications, and may be preset according to an actual requirement, any of which are merely example embodiments of this application.

3. Virtual Weapon

A virtual weapons is a weapon that can be used by a virtual object in a virtual environment, including a long-range virtual weapon and a short-range virtual weapon. The long-range virtual weapon is a virtual weapon that can be used to attack another virtual object at a position relatively far from the virtual object, such as a pistol, a rifle, a sniper rifle, or other virtual guns. The short-range virtual weapon is a virtual weapon that can be used to attack another virtual object at a short distance, such as a dagger, a sword, a knife, or an axe.

4. Shooter Games (STG)

STG is a type of action game with obvious characteristics of action games, and "shooting" needs to be presented in a specific action manner. Generally, STG includes first-person shooter (FPS) and third-person shooter (TPS). In some STGs, a user may switch between a first-person perspective and a third-person perspective.

FPS is an STG in which a user can play in a first-person perspective. A virtual environment picture in the game is a picture of a virtual environment observed with a perspective of a virtual object. In the game, at least two virtual objects play in a single-round battle mode in the virtual environment. The virtual object eludes attacks from other virtual objects and dangers (for example, a poison gas area and a swamp) in the virtual environment to survive in the virtual environment. When a health point of the virtual object in the virtual environment is zero, the life of the virtual object in the virtual environment ends, and the final virtual object surviving in the virtual environment wins. Optionally, the battle starts with a moment when the first client joins the battle, and ends with a moment when the last client exits the battle. Each client may control one or more virtual objects in the virtual environment. Optionally, arena modes of the battle may include a single-player battle mode, a two-player team battle mode, or a multi-player team battle mode. Battle mode is merely one example embodiment of this application.

TPS is an STG in which a user can play in a third-person perspective. A virtual environment picture in the game is a picture of a virtual environment observed with a perspective of an onlooker. In the game, the user may see a virtual object controlled by the user, which helps the user observe injuries, surroundings, and the like of the virtual object controlled by the user.

FIG. 1 is a schematic diagram of an implementation environment according to an embodiment of this application. The implementation environment may include a mobile terminal 10 and a server 20.

The mobile terminal 10 may be a portable electronic device, such as a mobile phone (e.g. smart phone), a tablet computer, a game console, an electronic book (ebook) reader, a multimedia playback device, and/or a wearable device. A client of a game application, such as a client of an STG application, may be installed in the mobile terminal 10. Alternatively, a terminal may not be mobile and may include other types of electronic devices that may not be portable, including some computers and video game consoles.

The server 20 is configured to provide a back-end service to the client of the application (for example, a game application) in the mobile terminal 10. For example, the server 20 may be a back-end server of the application (for example, the game application). The server 20 may be one server, a server cluster including a plurality of servers, or a cloud computing service center.

The mobile terminal 10 and the server 20 may communicate with each other through a network 30. The network 30 may be a wired network or a wireless network.

Figure 2:
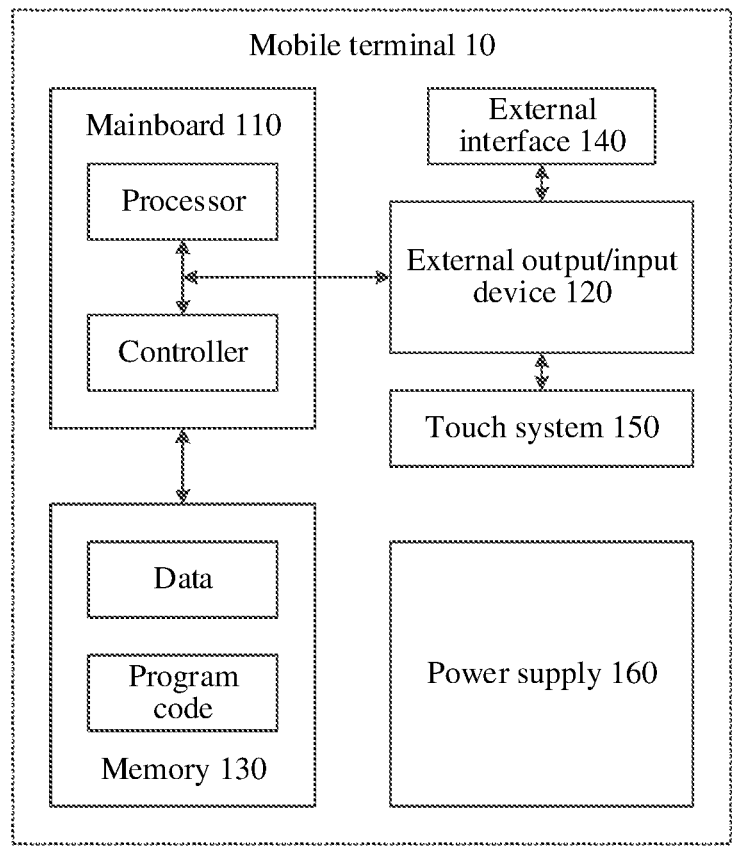
FIG. 2 is a schematic structural diagram of a mobile terminal according to an embodiment of this application.

Steps in method embodiments of this application may be performed by the mobile terminal. FIG. 2 is a schematic structural diagram of a mobile terminal according to an embodiment of this application. In one embodiment, the mobile terminal 10 may include a mainboard 110, an external output/input device 120, a memory 130, an external interface 140, a touch system 150, and a power supply 160.

Processing elements such as a processor and a controller are integrated in the mainboard 110.

The external output/input device 120 may include a display component (for example, a display screen), a sound playback component (for example, a speaker), a sound collecting component (for example, a microphone), and various buttons.

The memory 130 stores program code and data.

The external interface 140 may include an earphone interface, a charging interface, a data interface, and the like.

The touch system 150 may be integrated in the display component or the buttons of the external output/input device 120, and the touch system 150 is configured to detect touch operations performed by a user on the display component or the buttons.

The power supply 160 is configured to supply power to other components in the mobile terminal 10.

In this embodiment of this application, the processor in the mainboard 110 may generate a UI (for example, a game interface) by executing or invoking the program code and the data stored in the memory, and present the generated UI (for example, the game interface) by using the external output/input device 120. During presentation of the UI (for example, the game interface), a touch operation performed during interaction between the user and the UI (for example, the game interface) may be detected through the touch system 150, and a response is made to the touch operation.

Figure 3:
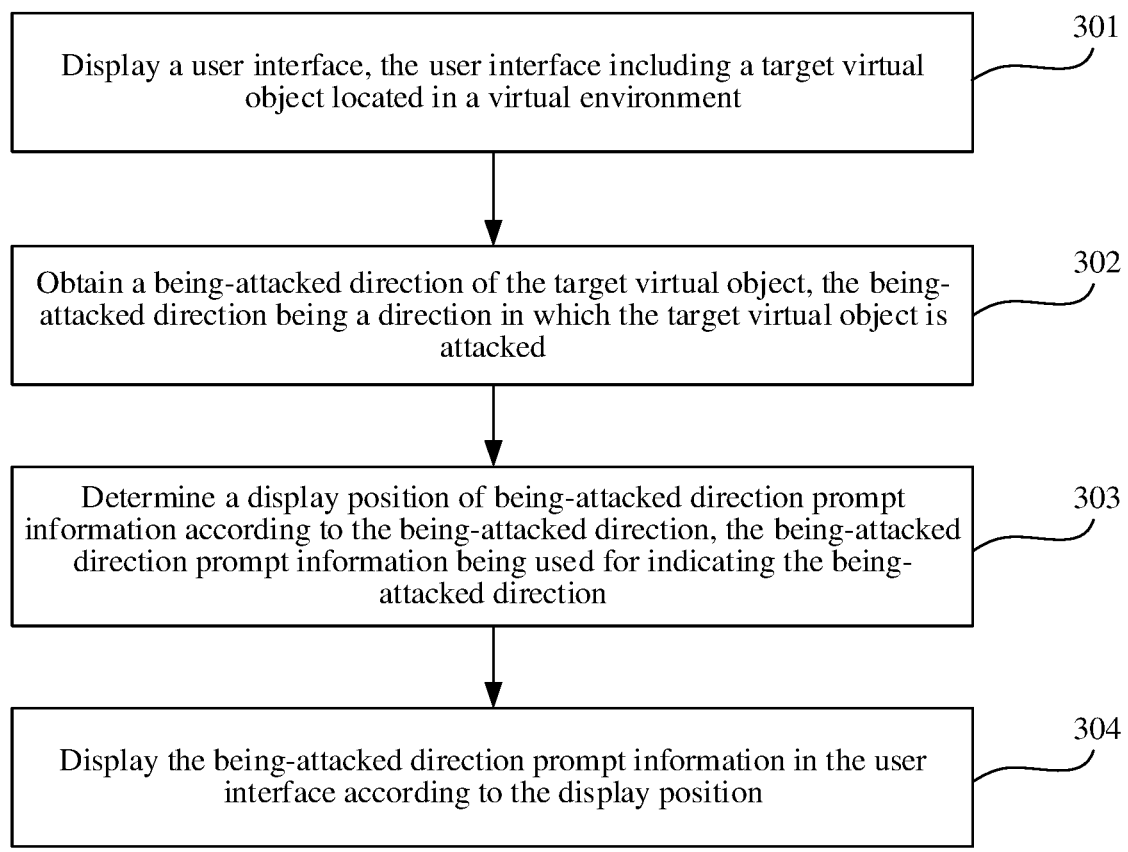
FIG. 3 is a flowchart of a method for prompting that a virtual object is attacked according to an embodiment of this application.

FIG. 3 is a flowchart of a method for prompting that a virtual object is attacked according to an embodiment of this application. The method is applicable to the mobile terminal described above, such as a client of an application (for example, an STG application) in the mobile terminal. The method may include the following steps (301 to 304):

Step 301: Display a UI, the UI including a target virtual object located in a virtual environment.

In this embodiment of this application, the UI includes an interface of an application. Using an STG application as an example, the UI may be a display interface of a game battle. The UI is configured to present a virtual environment of the game battle to a user. For example, the UI may include an element in the virtual environment, such as a virtual building, a virtual item, and a virtual object. Optionally, the UI further includes some operation controls, such as buttons, sliders, and icons, for the user to operate.

The target virtual object is a virtual object controlled by a client. Optionally, the virtual environment displayed in the UI is a picture of the virtual environment observed with a perspective of the target virtual object. The perspective is an observation angle for observing with a first-person perspective or a third-person perspective of the virtual object in the virtual environment. The perspective in this embodiment of this application is an angle for observing the virtual environment with a first-person perspective of the target virtual object. Optionally, the perspective is an angle for observing the virtual environment through a camera model in the virtual environment.

The camera model is a three-dimensional model around the virtual object in the virtual environment. The camera model is configured to observe the virtual environment or an element in the virtual environment, such as a virtual object, a virtual item, and a virtual weapon. When the first-person perspective is used, the camera model is located near the head of the virtual object or at the head of the virtual object. When the third-person perspective is used, the camera model may be located behind the virtual object and bound to the virtual object, or may be located at any position that is a preset distance away from the virtual object. The virtual object located in the virtual environment may be observed from different angles through the camera model. Optionally, when the third-person perspective is a first-person over-the-shoulder perspective, the camera model is located behind the virtual object (for example, the head and shoulders of a virtual character). Optionally, in addition to the first-person perspective and the third-person perspective, the perspective also includes other perspectives, such as a top perspective. When the top perspective is used, the camera model may be located above the head of the virtual object. The top perspective is a perspective for observing the virtual environment with an angle from the air. Optionally, the camera model is not actually displayed in the virtual environment. In other words, the camera model is not displayed in the virtual environment displayed in the UI.

Step 302: Obtain a being-attacked direction of the target virtual object, the being-attacked direction is a direction in which the target virtual object is attacked.

In addition to the target virtual object, there are other virtual objects in the virtual environment. Optionally, the other virtual objects include an enemy virtual object and a friendly virtual object. The enemy virtual object is a virtual object that has a hostile relationship with the target virtual object. The friendly virtual object is a virtual object that has no hostile relationship with the target virtual object. For example, the friendly virtual object may belong to the same team or the same organization as the target virtual object, and they are in a friend relationship or have a temporary permission to communicate with each other.

Optionally, the target virtual object may attack the other virtual objects in the virtual environment, and the other virtual objects may also attack the target virtual object in the virtual environment. Optionally, the attack may be an attack with a virtual weapon, such as shooting with a virtual gun or stabbing with a virtual dagger, or may be an attack without a virtual weapon, such as attacking with a first or kicking with a foot. Optionally, when a distance between a virtual object and an object to be attacked by the virtual object is relatively short, a short-range virtual weapon may be used to attack or no virtual weapon is used. When a distance between a virtual object and an object to be attacked by the virtual object is relatively long, a long-range virtual weapon may be used to attack. Optionally, in this embodiment of this application, to prompt that the target virtual object controlled by the client is attacked while reducing processing overheads of a server and the client, the client obtains the being-attacked direction of the target virtual object only when another virtual object attacks the target virtual object with a long-range virtual weapon. This embodiment of this application is described by using an example in which the target virtual object is attacked by a long-range virtual weapon and the long-range virtual weapon is a virtual gun or a virtual shell. Optionally, the target virtual object controlled by the client is not hurt when being attacked by the friendly virtual object. In other words, the target virtual object controlled by the client is hurt and the client performs subsequent steps only when the target virtual object is attacked by the enemy virtual object.

Figure 4:
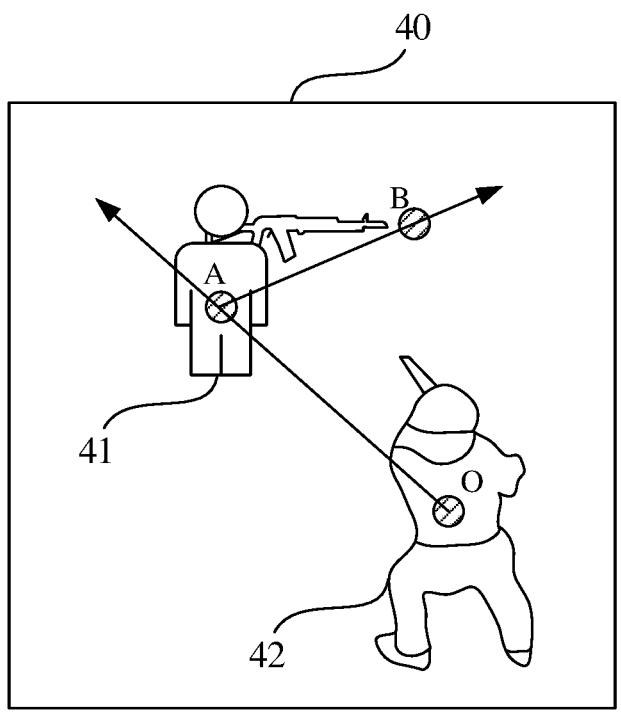
FIG. 4 is a schematic diagram of calculating a display position of being-attacked direction prompt information according to an embodiment of this application.

In this embodiment of this application, a notification that the target virtual object is attacked is sent by the server. To be specific, the server notifies the client that the target virtual object controlled by the client is attacked. When notifying the client that the target virtual object is attacked, the server gives a position of another virtual object that attacks the target virtual object. The client calculates a being-attacked direction of the target virtual object according to the position and a position of the target virtual object. For example, as shown in FIG. 4, a virtual environment 40 includes a target virtual object 41 and an enemy virtual object 42. A ray is connected to a position A point at which the target virtual object 41 is located by using a position O point at which the enemy virtual object 42 is located as a starting point. A direction of the ray OA is a being-attacked direction of the target virtual object 41.

Figure 5:
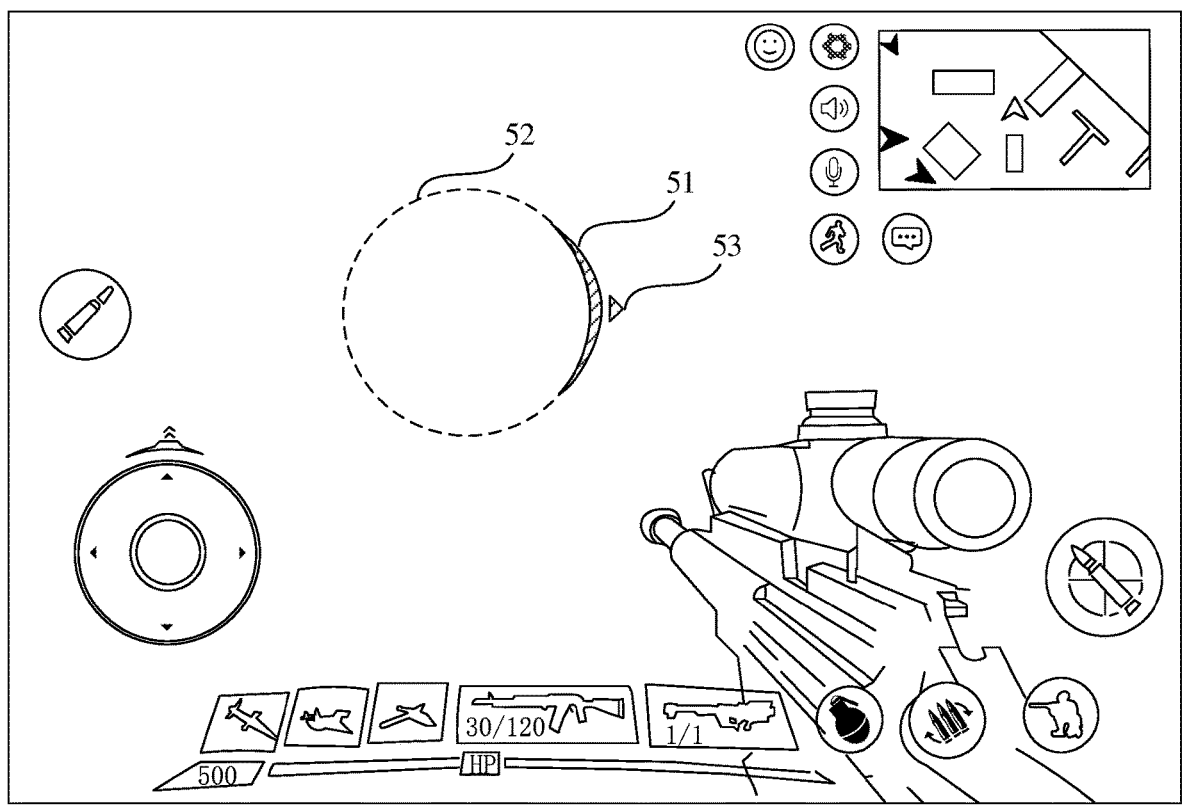
FIG. 5 is one embodiment of a schematic diagram of a UI involved in the embodiment shown in FIG. 3.
Figure 6:
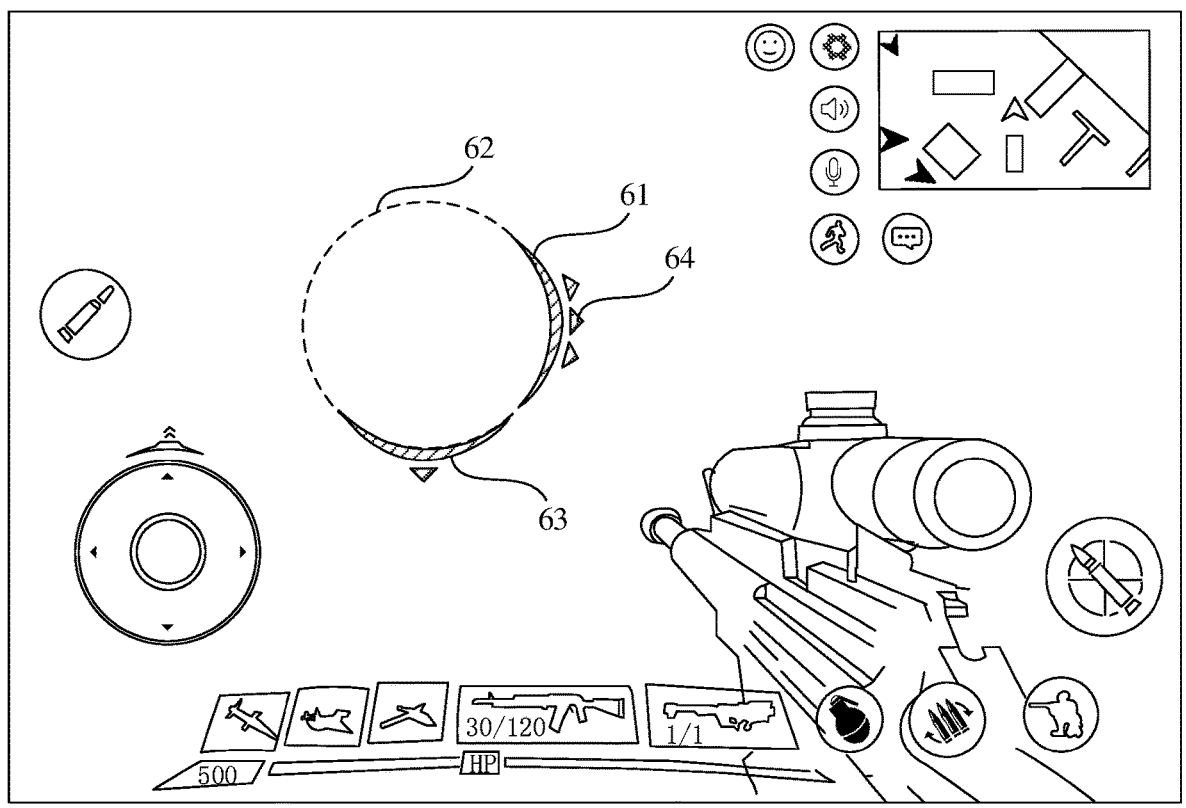
FIG. 6 is one embodiment of a schematic diagram of a UI involved in the embodiment shown in FIG. 3.

In a possible implementation, after the being-attacked direction of the target virtual object is obtained, the method further includes: obtaining being-attacked times corresponding to the being-attacked direction, the being-attacked times are a quantity of times that the target virtual object is attacked in the being-attacked direction; and displaying being-attacked times prompt information in the UI, the being-attacked times prompt information is used for indicating the being-attacked times. In this embodiment of this application, the obtaining being-attacked times corresponding to the being-attacked direction is obtaining being-attacked times of the target virtual object in the being-attacked direction within a period of time, the period of time is a duration starting from a current time. For example, as shown in FIG. 5, when the target virtual object is subject to one attack from left, being-attacked times prompt information 53 is displayed as a triangle in the UI, and there is one triangle. For example, as shown in FIG. 6, when the target virtual object is subject to three attacks from left, being-attacked times prompt information 64 is displayed as triangles in the UI, and there are three triangles.

In another possible implementation, to enhance an effect of prompting that the target virtual object is attacked, after the being-attacked direction of the target virtual object is obtained, the method further includes: determining, according to the being-attacked direction, a jitter direction of the virtual weapon held by the target virtual object, the jitter direction is a direction in which the virtual weapon deviates from an initial position; and controlling the virtual weapon to jitter according to the jitter direction.

Step 303: Determine a display position of being-attacked direction prompt information according to the being-attacked direction, the being-attacked direction prompt information is used for indicating the being-attacked direction.

A direction the target virtual object faces before being attacked is an initial direction. Optionally, the being-attacked direction prompt information corresponds to a default display position in the UI. When the being-attacked direction prompt information is at the default display position, the being-attacked direction prompt information is not displayed in the UI. The client calculates a deviation direction and a deviation angle according to the initial direction and the being-attacked direction of the target virtual object. The deviation direction and the deviation angle are used for indicating a direction and an angle by which the display position of the being-attacked direction prompt information deviates from the default display position. For example, as shown in FIG. 4, an initial direction of the target virtual object 41 is a direction of a ray AB, the being-attacked direction is the direction of the ray OA, a direction in which the ray OA deviates to the ray AB is the deviation direction, and an angle between the ray OA and the ray AB is the deviation angle. The display position of the being-attacked direction prompt information can be determined according to the deviation direction and the deviation angle.

Step 304: Display the being-attacked direction prompt information in the UI according to the display position.

To improve a display effect of the UI, the being-attacked direction prompt information is displayed only after the client determines the display position. In other words, when the being-attacked direction prompt information corresponds to the default display position, and the client has not determined the display position of the being-attacked direction prompt information, the being-attacked direction prompt information is not displayed at the default display position of the UI. Optionally, to diversify a display style of the being-attacked direction prompt information and improve the display effect of the UI, the display style of the being-attacked direction prompt information is related to at least one type of the following information: a being-attacked distance, a being-attacked time, being-attacked times, or a being-attacked damage. For example, if the display style of the being-attacked direction prompt information is related to the being-attacked damage, when the target virtual object suffers more damage, the being-attacked direction prompt information is gradually in a darker color, to clearly and timely prompting the user.

In a possible implementation, after the being-attacked direction prompt information is displayed in the UI according to the display position, the method includes: canceling the display of the being-attacked direction prompt information in the UI in a case that a display duration of the being-attacked direction prompt information reaches a preset duration, and the target virtual object is subject to no other attacks from the being-attacked direction within the preset duration. In this embodiment of this application, the preset duration is a display duration preset by the client for the being-attacked direction prompt information. When the display duration of the being-attacked direction prompt information reaches the preset duration, the display of the being-attacked direction prompt information is canceled.

Based on the above, according to the technical solutions provided in various embodiments of this application, a being-attacked direction of a virtual object is obtained, a display position of being-attacked direction prompt information is determined according to the being-attacked direction, and the being-attacked direction prompt information is displayed in a UI, to prompt the being-attacked direction. Compared with the related art in which a being-attacked prompt is used only for prompting that the virtual object is attacked, the being-attacked prompt in this embodiment of this application not only prompts that the virtual object is attacked, but also prompts the direction in which the virtual object is attacked, thereby diversifying content of the being-attacked prompt, providing more valuable information, and providing more reference for a subsequent operation of a user. Moreover, in this embodiment of this application, a display style of being-attacked direction prompt information varies with a plurality of factors, thereby diversifying the display style of the being-attacked direction prompt information and improving a display effect of the UI.

In addition, according to the technical solutions provided in this embodiment of this application, being-attacked times prompt information is further displayed in the UI according to being-attacked times of the virtual object, to help the user more clearly know how specifically the virtual object controlled by the user is attacked, and deal with the attack in time.

In a possible implementation, the being-attacked direction prompt information includes: an arc-shaped UI element. The determining a display position of being-attacked direction prompt information according to the being-attacked direction includes: determining a display position of the arc-shaped UI element according to the being-attacked direction; a position of the arc-shaped UI element relative to a center matching a position of the target virtual object relative to an enemy virtual object that launches the attack.

Optionally, the arc-shaped UI element includes an arc, and the arc is used for indicating the being-attacked direction. For example, as shown in FIG. 5, when the target virtual object is subject to an attack from left, an arc of an arc-shaped UI element 51 is displayed in right of a circle 52 corresponding to the arc. For example, as shown in FIG. 6, when the target virtual object is subject to three attacks from left, an arc of an arc-shaped UI element 61 is displayed in right of a circle 62 corresponding to the arc. As shown in FIG. 6, when being attacked from the front left left, the target virtual object is attacked from back, and a new arc-shaped UI element 63 is displayed in the UI. In this embodiment of this application, the circle corresponding to the arc of the arc-shaped UI element is not displayed in the UI, and the circle in FIG. 5 and FIG. 6 is displayed in a form of a dashed line in the UI merely for description.

A radius of the circle in which the arc corresponding to the arc-shaped UI element is located and a position of a center of the circle are just one example embodiment of this application. Optionally, the center overlaps with a central point of a front sight of a virtual weapon held by the target virtual object. Optionally, the radius of the circle in which the arc corresponding to the arc-shaped UI element is located is determined by the client according to a size of the UI displayed by the client. The radius has a positive correlation with the size of the UI. To be specific, a larger UI indicates a larger radius; a smaller UI indicates a smaller radius. For example, because a UI displayed on a computer is larger than a UI displayed on a mobile phone, a corresponding radius when the client is a computer is larger than a corresponding radius when the client is a mobile phone.

Optionally, the UI includes a first view layer and a second view layer. A display level of the first view layer is higher than a display level of the second view layer. The arc-shaped UI element is located in the first view layer, and a game picture used for displaying the virtual environment of the game battle is located in the second view layer. Certainly, in addition to the arc-shaped UI element described above, the first view layer may further include some operation controls, such as an operation control for controlling a posture of the virtual object, and an operation control for controlling virtual equipment assembled by the virtual object. This is merely one example embodiment of this application.

Figure 7:
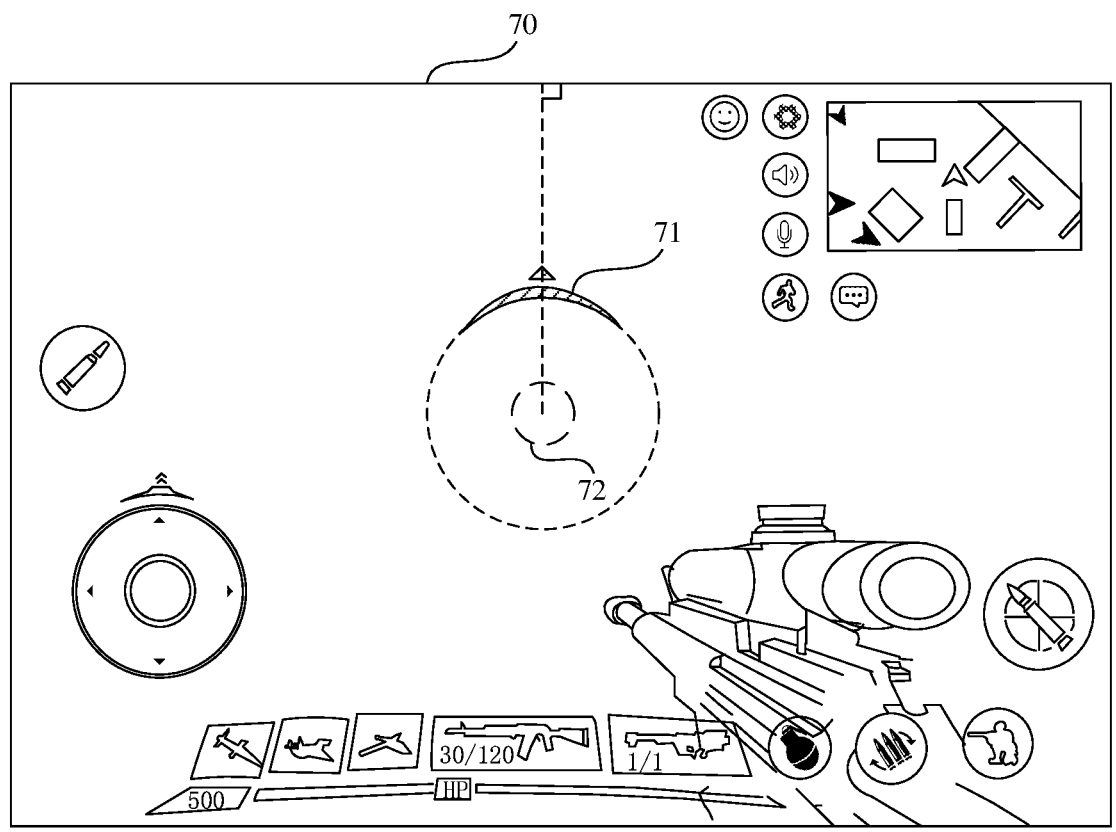
FIG. 7 is one embodiment of a schematic diagram of a UI involved in the embodiment shown in FIG. 3.
Figure 8:
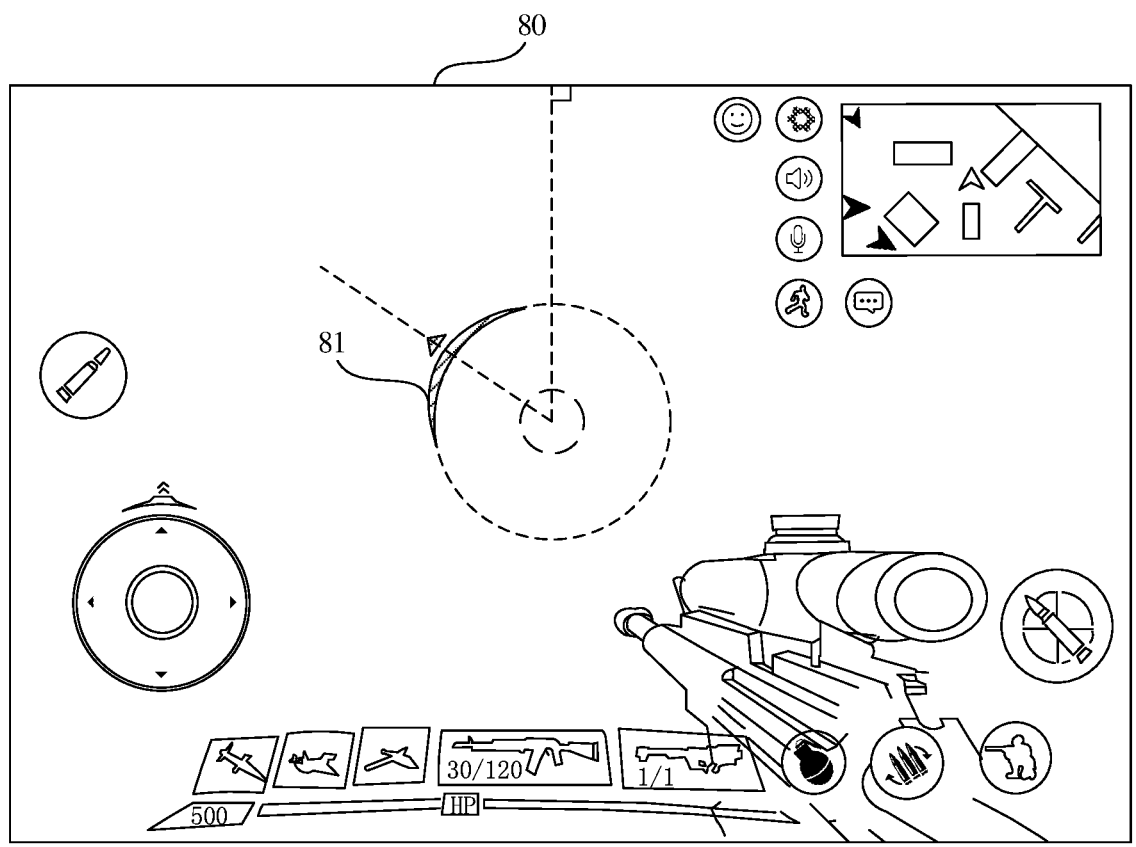
FIG. 8 is one embodiment of a schematic diagram of a UI involved in the embodiment shown in FIG. 3.

Optionally, the arc-shaped UI element corresponds to a default display position in the UI, and the default display position is determined by the front sight of the virtual weapon held by the target virtual object. In this embodiment of this application, the position of the arc-shaped UI element relative to the center is represented by a display parameter. The display parameter includes a deviation direction and a deviation angle of a connection line between a central point of the arc-shaped UI element and the center relative to a standard line. The standard line is a connection line between a central point of the arc-shaped UI element when the arc-shaped UI element is displayed at the default display position and the center. For example, as shown in FIG. 7, a front sight 72 of the virtual weapon held by the target virtual object is located at a center of a UI 70, a default display position of an arc-shaped UI element 71 in the UI 70 is in an area above the center of the UI 70, and a center of a circle in which an arc corresponding to the arc-shaped UI element 71 is located overlaps with a central point of the front sight 72. In this case, a connection line between a central point of the arc-shaped UI element 71 and the center is perpendicular to a side corresponding to a length of the UI. To improve the display effect of the UI, in this embodiment of this application, when at the default display position, the arc-shaped UI element 71 is not displayed in the UI. The arc-shaped UI element is drawn in the UI in FIG. 7 merely for describing display of the arc-shaped UI element at the default display position. As shown in FIG. 4, a virtual environment 40 includes a target virtual object 41 and an enemy virtual object 42. An initial direction of the target virtual object 41 is a direction of a ray AB, a being-attacked direction is a direction of a ray OA, a direction in which the ray OA deviates to the ray AB is a deviation direction, and an angle between the ray OA and the ray AB is a deviation angle. The deviation direction and the deviation angle of the arc-shaped UI element are calculated according to FIG. 4. As shown in FIG. 8, a display position of an arc-shaped UI element 81 is adjusted. An angle between a connection line between a central point of the adjusted arc-shaped UI element 81 and a center and a connection line between a central point of the arc-shaped UI element 81 at a default display position and the center is the deviation angle shown in FIG. 4. A deviation direction of the connection line between the central point of the adjusted arc-shaped UI element 81 and the center relative to the connection line between the central point of the arc-shaped UI element 81 at the default display position and the center corresponds to the deviation direction shown in FIG. 4.

Based on the above, according to the technical solutions provided in the embodiments of this application, being-attacked direction prompt information is represented by an arc-shaped UI element, thereby improving a display effect of a UI. In addition, according to the technical solutions provided by embodiments of this application, a display style of the arc-shaped UI element may be further adjusted according to being-attacked times, thereby helping a user clearly know a being-attacked direction and being-attacked times of a virtual object controlled by the user, and improving human-computer interaction experience.

Figure 9:
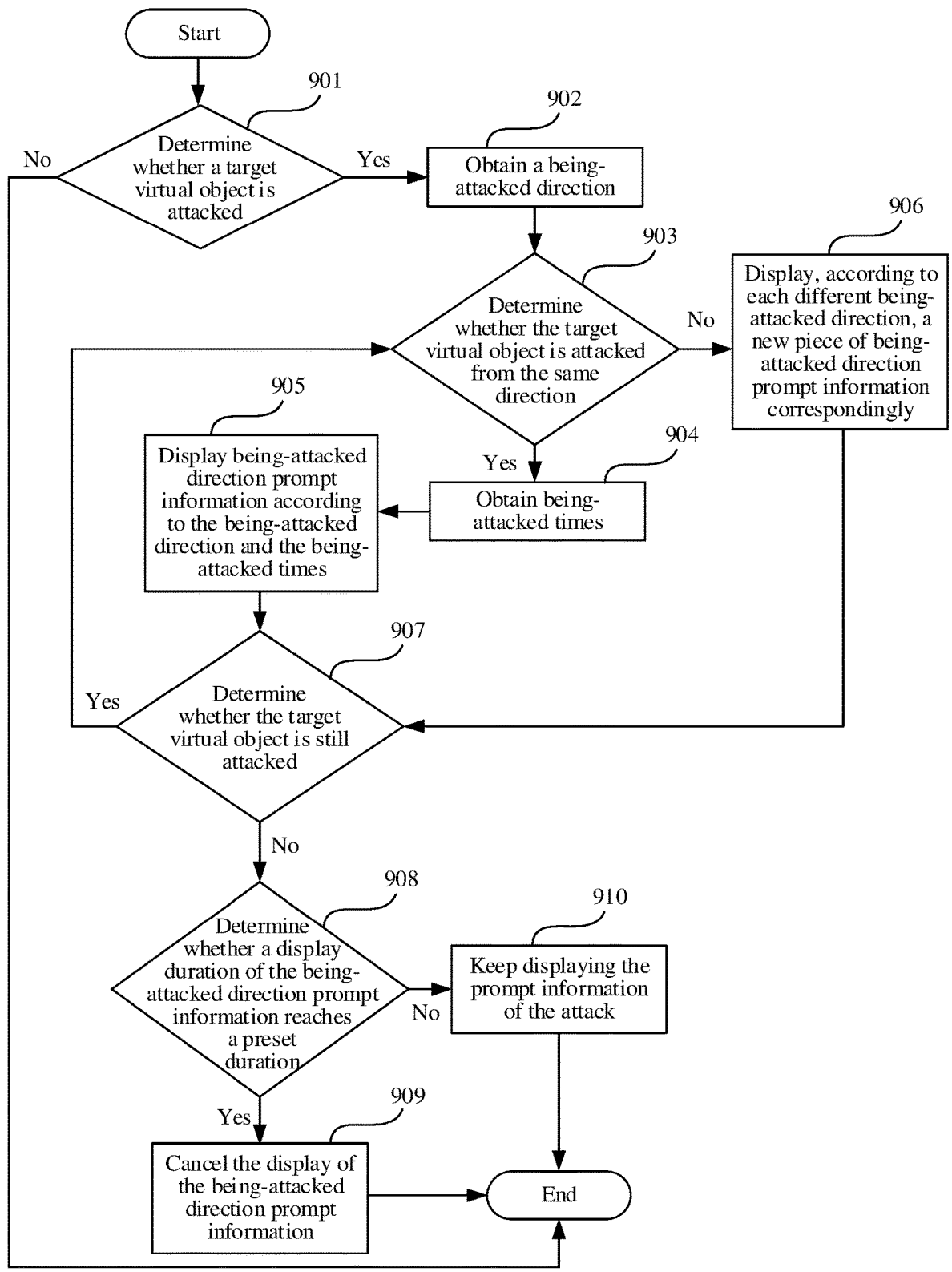
FIG. 9 is a flowchart of a method for prompting that a virtual object is attacked according to another embodiment of this application.

In a possible implementation, as shown in FIG. 9, the method for prompting that a virtual object is attacked may alternatively include the following steps (901 to 910):

Step 901: Determine whether a target virtual object is attacked. If yes, perform step 902. If no, end the procedure.

Step 902: Obtain a being-attacked direction.

Step 903: Determine whether the target virtual object is attacked from the same direction. If yes, perform step 904. If no, perform step 906.

Step 904: Obtain being-attacked times.

Step 905: Display, according to the being-attacked direction and the being-attacked times, being-attacked direction prompt information.

Step 906: Display, according to each different being-attacked direction, a new piece of being-attacked direction prompt information correspondingly.

Step 907: Determine whether the target virtual object is still attacked. If yes, perform step 903. If no, perform step 908.

Step 908: Determine whether a display duration of the being-attacked direction prompt information reaches a preset duration. If yes, perform step 909. If no, perform step 910.

Step 909: Cancel the display of the being-attacked direction prompt information.

Step 910: Keep displaying the being-attacked direction prompt information.

Figure 10:
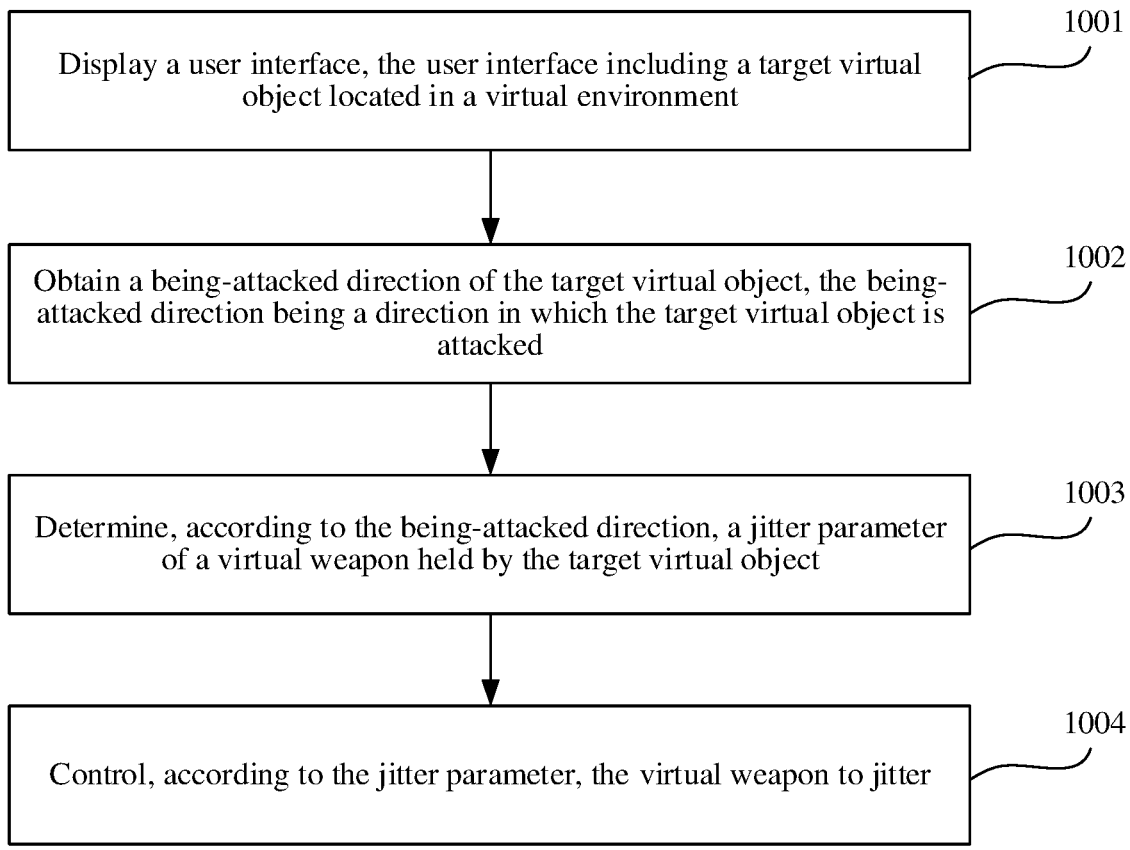
FIG. 10 is a flowchart of a method for prompting that a virtual object is attacked according to still another embodiment of this application.

FIG. 10 is a flowchart of a method for prompting that a virtual object is attacked according to another embodiment of this application. The method is applicable to the mobile terminal described above, such as a client of an application (for example, an STG application) in the mobile terminal. The method may include the following steps (1001 to 1004):

Step 1001: Display a UI, the UI including a target virtual object located in a virtual environment.

Based on the explanation of step 301 in the method for prompting that a virtual object is attacked provided in the optional embodiment of this application, explanation of step 1001 in the method for prompting that a virtual object is attacked provided in this embodiment may be obtained. For the explanation of step 1001, refer to the explanation of step 301 as one example.

Step 1002: Obtain a being-attacked direction of the target virtual object, the being-attacked direction is a direction in which the target virtual object is attacked.

Based on the explanation of step 302 in the method for prompting that a virtual object is attacked provided in the optional embodiment of this application, explanation of step 1002 in the method for prompting that a virtual object is attacked provided in this embodiment may be obtained. In some embodiments, step 1002 may operate similar to step 302 as described above.

In a possible implementation, after the obtaining a being-attacked direction of the target virtual object, the method further includes: determining a display position of being-attacked direction prompt information according to the being-attacked direction, the being-attacked direction prompt information is used for indicating the being-attacked direction; and displaying the being-attacked direction prompt information in the UI according to the display position.

Step 1003: Determine, according to the being-attacked direction, a jitter parameter of a virtual weapon held by the target virtual object.

The jitter parameter is a parameter based on which the virtual weapon jitters, and the jitter parameter may include a jitter direction and a jitter angle. Optionally, the determining, according to the being-attacked direction, a jitter parameter of a virtual weapon held by the target virtual object includes: determining a jitter direction and a jitter angle of the virtual weapon according to the being-attacked direction; the jitter parameter including the jitter direction and the jitter angle, the jitter direction is a direction in which the virtual weapon deviates from an initial position, and the jitter angle is an angle at which the virtual weapon deviates from the initial position. Optionally, the jitter direction is opposite to the being-attacked direction. Optionally, to improve a display effect of jitter, the virtual weapon jitters around a fulcrum. Optionally, the jitter angle may be determined according to a distance between an enemy virtual object and the target virtual object, which is one example embodiment of this application. Optionally, to improve a display effect of the UI, the jitter angle corresponds to an angle threshold, and a maximum jitter angle cannot exceed the angle threshold. The angle threshold may be preset, which is one example embodiment of this application.

Figure 11:
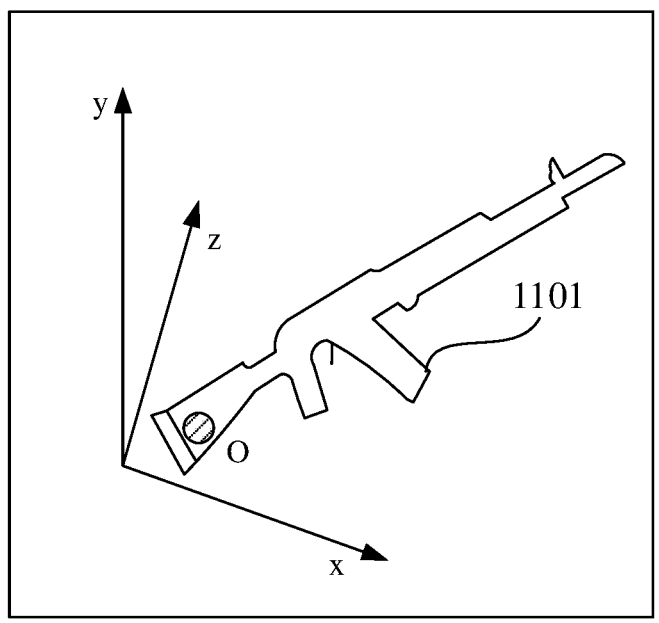
FIG. 11 is a schematic diagram of calculating a jitter parameter according to an embodiment of this application.

For example, as shown in FIG. 11, a virtual weapon 1101 corresponds to a fulcrum O point in a three-dimensional coordinate system xyz, and an initial position of the virtual weapon is located on a z axis of the three-dimensional coordinate system xyz. When the target virtual object holding the virtual weapon is attacked from left, that is, a positive direction of the x axis, a jitter direction of the virtual weapon 1101 is determined to be a right direction, that is, the positive direction of the x axis, and a jitter angle of the virtual weapon 1101 is 15 degrees.

Referring back to FIG. 10, Step 1004: Cause, according to the jitter parameter, the virtual weapon to jitter.

Figure 12:
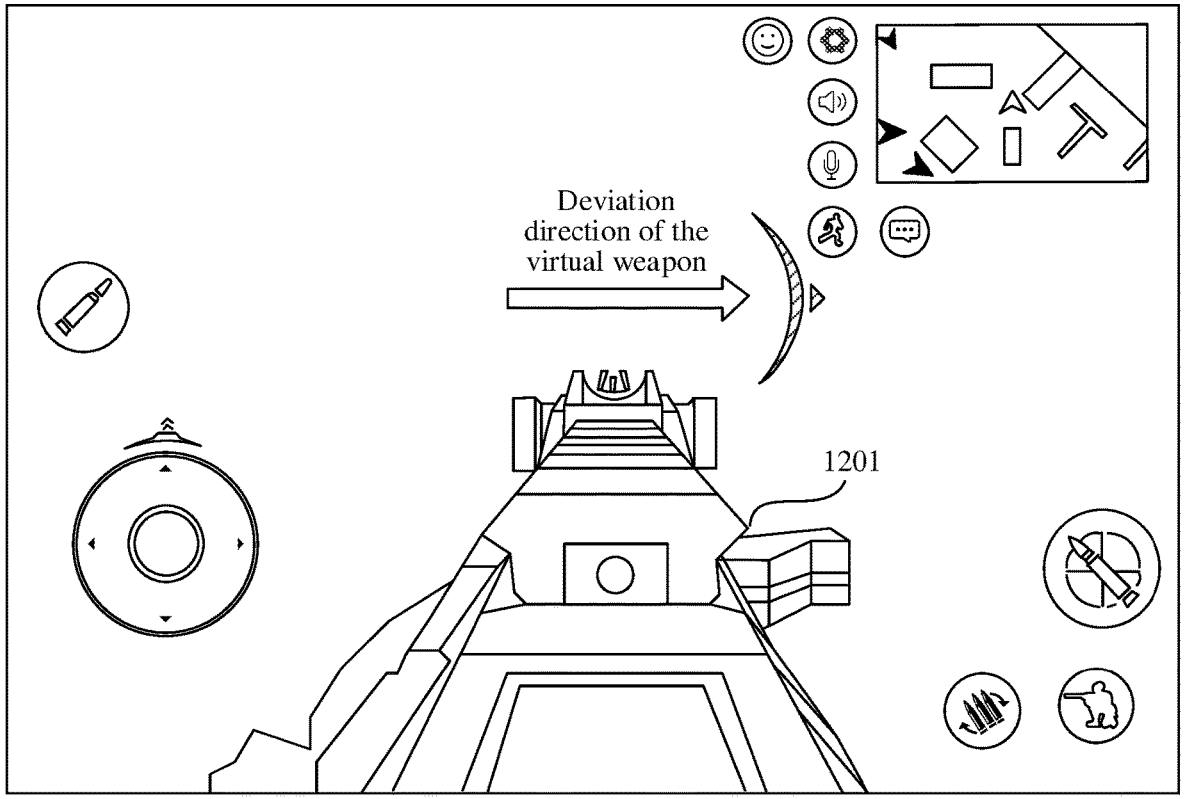
FIG. 12 is a schematic diagram of a UI according to yet another embodiment of this application.

Optionally, the virtual weapon corresponds to a camera model. When a first-person perspective is used, the camera model is located behind the virtual weapon and bound to the virtual weapon. Optionally, the camera model is not actually displayed in the virtual environment. In other words, the camera model is not displayed in the virtual environment displayed in the UI. Optionally, as shown in FIG. 12, the virtual weapon 1201 corresponds to a camera model. When the target virtual object holding the virtual weapon 1201 is attacked from a left, the virtual weapon 1201 jitters to the right. When the virtual weapon 1201 jitters, a position of the virtual weapon 1201 changes, but a position of the camera model does not change.

Figure 13:
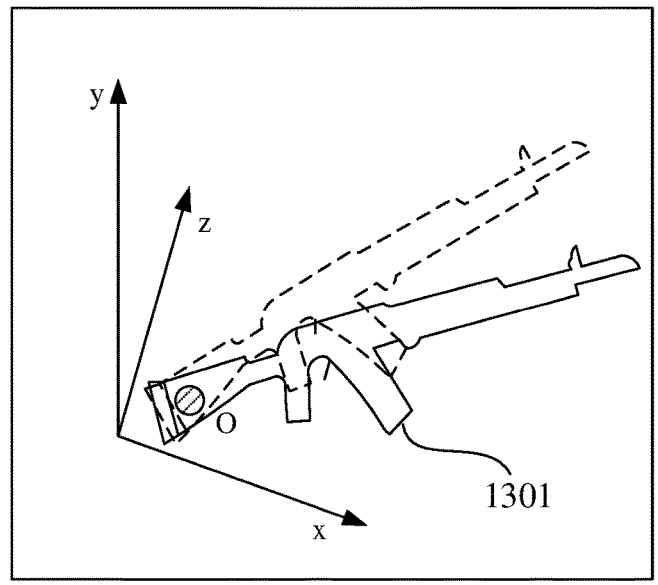
FIG. 13 is a schematic diagram of causing a virtual weapon to jitter according to another embodiment of this application.

In a possible implementation, the causing, according to the jitter parameter, the virtual weapon to jitter includes: causing the virtual weapon to move from the initial position to a target position, the target position is a position obtained through rotation by the jitter angle from the initial position along the jitter direction with a preset reference point as a rotation center; and causing the virtual weapon to return form the target position to the initial position. The cause of the jitter may also be referred to as controlling the jitter. For example, as shown in FIG. 13, the preset reference point is an O point, and according to the jitter direction and the jitter angle determined in FIG. 11, a virtual weapon 1301 rotates the jitter angle along the jitter direction with the O point as a rotation center, to rotate from an initial position to a target position. After the virtual weapon 1301 reaches the target position, the client controls the virtual weapon 1301 to return from the target position to the initial position, to complete a jitter effect.

Based on the above, according to the technical solutions provided in this embodiment of this application, a being-attacked direction of a virtual object is obtained, and a virtual weapon held by the virtual object is controlled according to the being-attacked direction to jitter, to allow a user to perceive the attack and determine the being-attacked direction according to a jitter status of the virtual weapon, thereby prompting the being-attacked direction, diversifying content of the being-attacked prompt, and providing more valuable information. Furthermore, such a manner is more intuitive and clearer, making it easy to draw the attention of the user.

Figure 14:
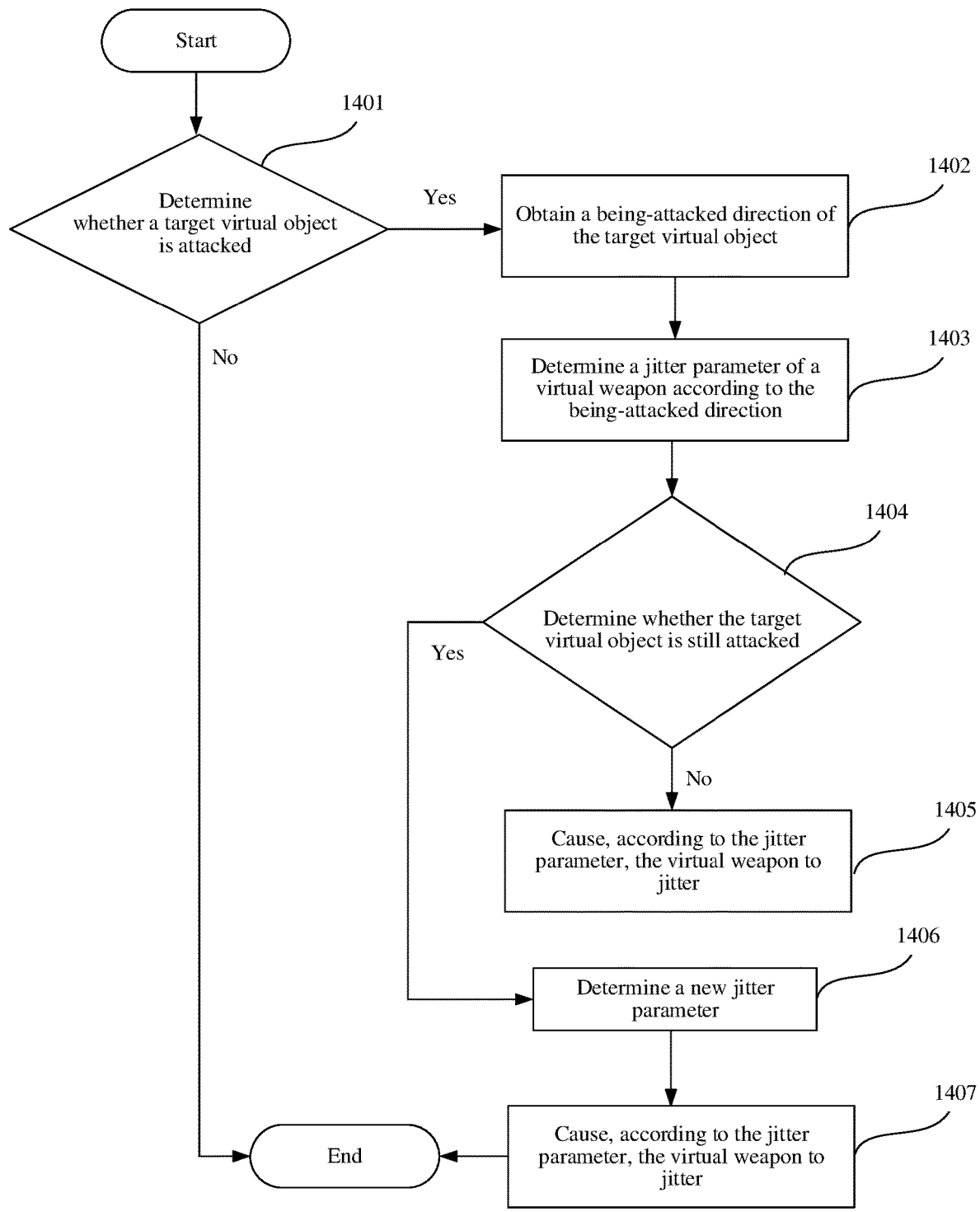
FIG. 14 is a flowchart of a method for prompting that a virtual object is attacked according to still yet another embodiment of this application.

In a possible implementation, as shown in FIG. 14, the method for prompting that a virtual object is attacked may alternatively include the following steps (1401 to 1407):

Step 1401: Determine whether a target virtual object is attacked. If yes, perform step 1402. If no, end the procedure.

Step 1402: Obtain a being-attacked direction of the target virtual object.

Step 1403: Determine a jitter parameter of a virtual weapon according to the being-attacked direction.

Step 1404: Determine whether the target virtual object is still attacked. If yes, perform step 1406. If no, perform step 1405.

Step 1405: Cause, according to the jitter parameter, the virtual weapon to jitter.

Step 1406: Determine a new jitter parameter.

Step 1407: Cause, according to the jitter parameter, the virtual weapon to jitter.

The following describes example apparatus embodiments of this application, which can be used to execute the method embodiments of this application. For further details of the apparatus embodiments of this application, refer to the method embodiments of this application.

Figure 15:
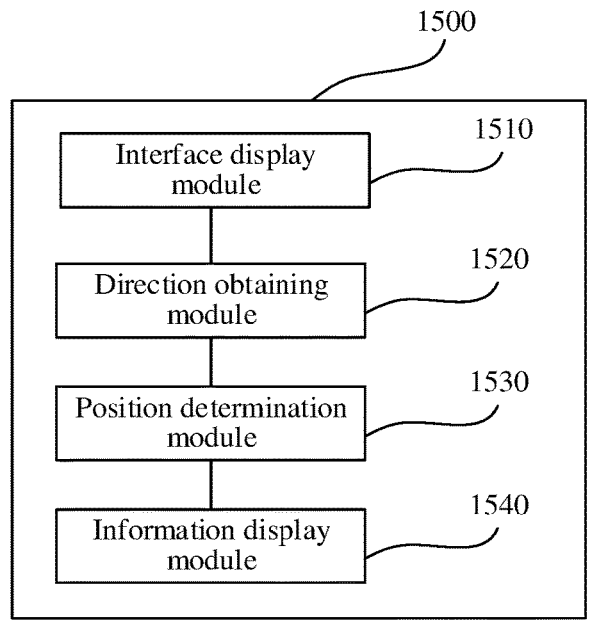
FIG. 15 is a block diagram of an apparatus for prompting that a virtual object is attacked according to an embodiment of this application.

FIG. 15 is a block diagram of an apparatus for prompting that a virtual object is attacked according to an embodiment of this application. The apparatus has functions of implementing the foregoing method examples. The functions may be implemented by using hardware, or may be implemented by hardware executing corresponding software. The apparatus may be a mobile terminal or set in a mobile terminal. An apparatus 1500 may include: an interface display module 1510, a direction obtaining module 1520, a position determination module 1530, and an information display module 1540.

The interface display module 1510 is configured to display a UI, the UI including a target virtual object located in a virtual environment.

The direction obtaining module 1520 is configured to obtain a being-attacked direction of the target virtual object, the being-attacked direction is a direction in which the target virtual object is attacked.

The position determination module 1530 is configured to determine a display position of being-attacked direction prompt information according to the being-attacked direction, the being-attacked direction prompt information is used for indicating the being-attacked direction.

The information display module 1540 is configured to display the being-attacked direction prompt information in the UI according to the display position.

In some embodiments, the being-attacked direction prompt information includes an arc-shaped UI element. The information display module 1540 is further configured to: determine a display position of the arc-shaped UI element according to the being-attacked direction; a position of the arc-shaped UI element relative to a center matching a position of the target virtual object relative to an enemy virtual object that launches the attack.

In some embodiments, the center overlaps with a central point of a front sight of a virtual weapon held by the target virtual object.

Figure 16:
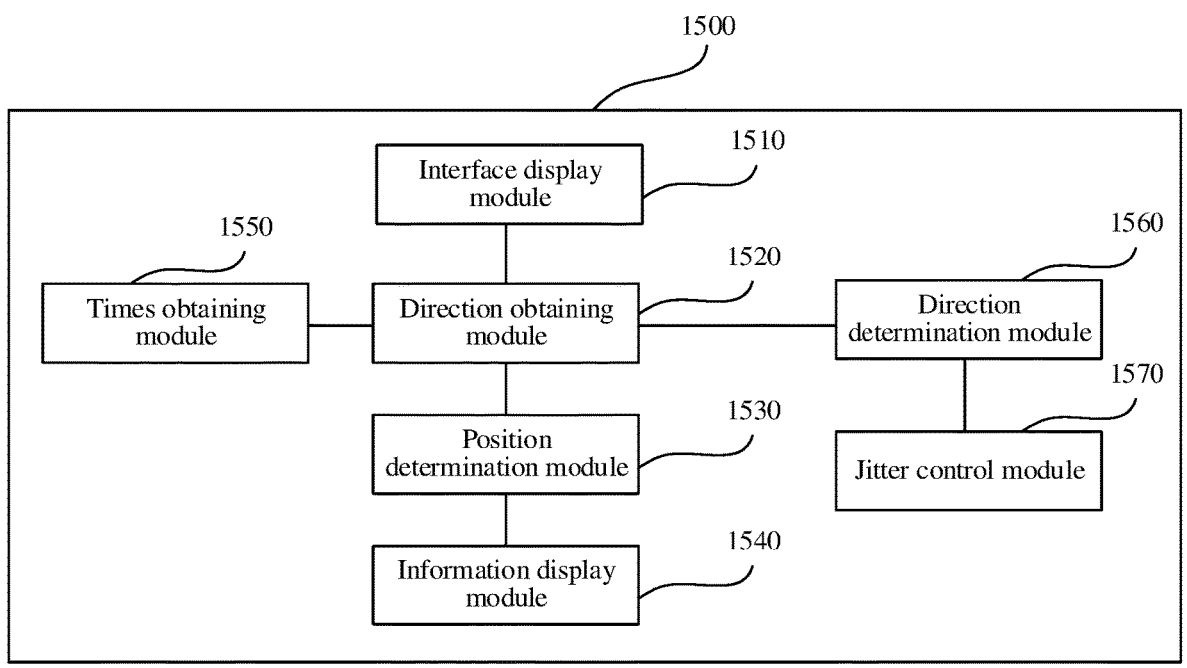
FIG. 16 is a block diagram of an apparatus for prompting that a virtual object is attacked according to another embodiment of this application.

In some embodiments, as shown in FIG. 16, the apparatus 1500 further includes a times obtaining module 1550, configured to obtain being-attacked times corresponding to the being-attacked direction, the being-attacked times are a quantity of times that the target virtual object is attacked in the being-attacked direction. The information display module 1540 is further configured to display being-attacked times prompt information in the UI, the being-attacked times prompt information is used for indicating the being-attacked times.

In some embodiments, a display style of the being-attacked direction prompt information is related to at least one type of the following information: a being-attacked distance, a being-attacked time, being-attacked times, or a being-attacked damage.

In some embodiments, the information display module 1540 is further configured to: cancel the display of the being-attacked direction prompt information in the UI when a display duration of the being-attacked direction prompt information reaches a preset duration, and the target virtual object is subject to no other attacks from the being-attacked direction within the preset duration.

In some embodiments, the apparatus 1500 further includes: a direction determination module 1560, configured to determine, according to the being-attacked direction, a jitter direction of the virtual weapon held by the target virtual object, the jitter direction is a direction in which the virtual weapon deviates from an initial position; and a jitter control module 1570, configured to cause the virtual weapon to jitter according to the jitter direction.

Based on the above, according to the technical solutions provided in this embodiment of this application, a display position of being-attacked direction prompt information is determined according to a being-attacked direction of a virtual object, and the being-attacked direction prompt information is displayed in a UI, so as to clearly and timely prompt a user that the virtual object controlled by the user is attacked and prompt the being-attacked direction, thereby resolving the problem that being-attacked prompt information is relatively obscure in the related art, and improving human-computer interaction experience. Moreover, in this embodiment of this application, a display style of the being-attacked direction prompt information varies with a plurality of factors, thereby diversifying the display style of the being-attacked direction prompt information and improving a display effect of the UI.

In addition, according to the technical solutions provided in this embodiment of this application, attacked times prompt information is further displayed in the UI according to being-attacked times of the virtual object, to help the user more clearly know how specifically the virtual object controlled by the user is attacked, and deal with the attack in time. Further, according to the technical solutions provided in this embodiment of this application, a jitter direction is determined according to the being-attacked direction, and a virtual weapon held by the virtual object is caused to jitter according to the jitter direction, which further enhances an effect of the being-attacked prompt.

Figure 17:
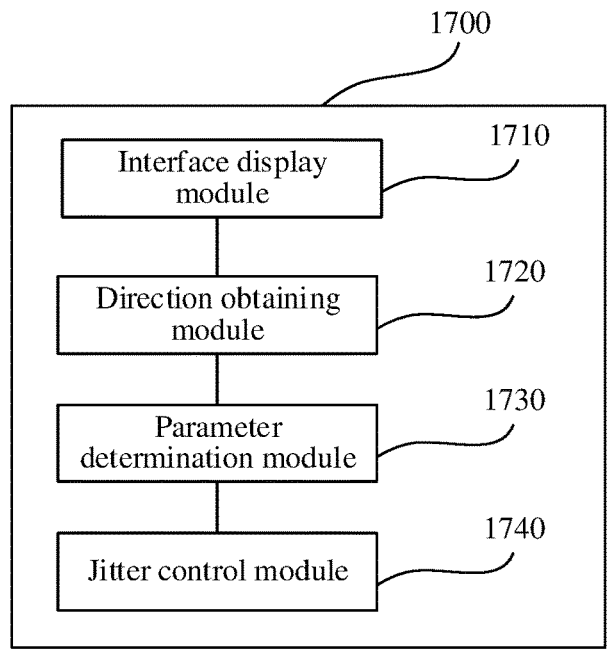
FIG. 17 is a block diagram of an apparatus for prompting that a virtual object is attacked according to still another embodiment of this application.

FIG. 17 is a flowchart of an apparatus for prompting that a virtual object is attacked according to another embodiment of this application. The apparatus has functions of implementing the foregoing method examples. The functions may be implemented by using hardware, or may be implemented by hardware executing corresponding software. The apparatus may be a mobile terminal or set in a mobile terminal. An apparatus 1700 may include: an interface display module 1710, a direction obtaining module 1720, a parameter determination module 1730, and a jitter control module 1740.

The interface display module 1710 is configured to display a UI, the UI including a target virtual object located in a virtual environment.

The direction obtaining module 1720 is configured to obtain a being-attacked direction of the target virtual object, the being-attacked direction is a direction in which the target virtual object is attacked.

The parameter determination module 1730 is configured to determine, according to the being-attacked direction, a jitter parameter of a virtual weapon held by the target virtual object.

The jitter control module 1740 is configured to cause, according to the jitter parameter, the virtual weapon to jitter.

In some embodiments, the jitter control module 1740 is further configured to: determine a jitter direction and a jitter angle of the virtual weapon according to the being-attacked direction; the jitter parameter including the jitter direction and the jitter angle, the jitter direction is a direction in which the virtual weapon deviates from an initial position, and the jitter angle is an angle at which the virtual weapon deviates from the initial position.

In some embodiments, the jitter control module 1740 is further configured to: cause the virtual weapon to move from the initial position to a target position, the target position is a position obtained through rotation by the jitter angle from the initial position along the jitter direction with a preset reference point as a rotation center; and cause the virtual weapon to return form the target position to the initial position.

In some embodiments, the jitter direction is opposite to the being-attacked direction.

Based on the above, according to the technical solutions provided in this embodiment of this application, a jitter parameter of a virtual weapon is determined according to a being-attacked direction, and the virtual weapon is controlled according to the jitter parameter to jitter, which provides a new being-attacked prompt solution through extension, and can more intuitively prompt in a UI that a virtual object controlled by a user is attacked, thereby improving human-computer interaction experience.

When the apparatus provided in the foregoing embodiment implements the functions of the apparatus, only division of the foregoing function modules is used as an example for description. In the practical application, the functions may be allocated to and completed by different function modules according to requirements. That is, an internal structure of the device is divided into different function modules, to complete all or some of the functions described above. In addition, the apparatus and method embodiments provided in the foregoing embodiments belong to one conception. The implementation may be according to the method embodiments described above, and details are not described herein again.

Figure 18:
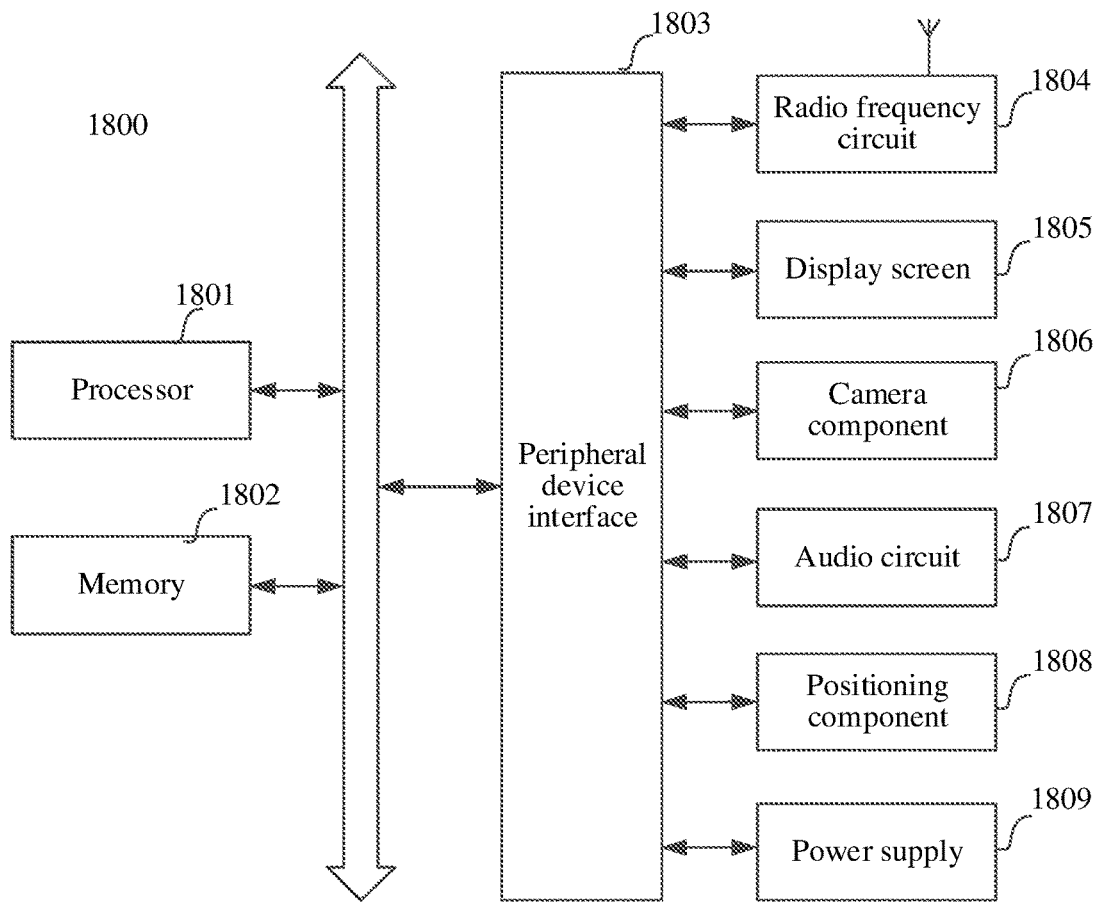
FIG. 18 is a structural block diagram of a mobile terminal according to an embodiment of this application.

FIG. 18 is a structural block diagram of a terminal 1800 according to an embodiment of this application. The terminal 1800 may be an electronic device, such as a mobile phone, a tablet computer, a game console, an ebook reader, a multimedia playback device, computer, or a wearable device. The terminal 1800 is configured to implement the method for prompting that a virtual object is attacked provided in the foregoing embodiment. The terminal 1800 may be a mobile terminal that includes a portable electronic device as in the mobile terminal 10 from the implementation environment shown in FIG. 1. In one embodiment:

Generally, the terminal 1800 includes a processor 1801 and a memory 1802.

The processor 1801 may include one or more processing cores, for example, may be a 4-core processor or an 8-core processor. The processor 1801 may be implemented by using at least one hardware form of a digital signal processor (DSP), a field programmable gate array (FPGA), and a programmable logic array (PLA). The processor 1801 may alternatively include a main processor and a coprocessor. The main processor is a processor configured to process data in an awake state, also referred to as a central processing unit (CPU), and the coprocessor is a low-power processor configured to process data in an idle state. In some embodiments, the processor 1801 may be integrated with a graphics processing unit (GPU). The GPU is configured to be responsible for rendering and drawing content to be displayed by a display screen. In some embodiments, the processor 1801 may further include an artificial intelligence (AI) processor. The AI processor is configured to process a calculation operation related to machine learning.

The memory 1802 may include one or more computer-readable storage media. The computer-readable storage medium may be non-transient. The memory 1802 may further include a high-speed random access memory and a non-transitory memory, such as one or more magnetic disk storage devices or flash storage devices. In some embodiments, the non-transient computer-readable storage medium in the memory 1802 is configured to store at least one instruction, at least one program, a code set, or an instruction set, the at least one instruction, the at least one program, the code set, or the instruction set being configured to be executed by one or more processors to implement the method for prompting that a virtual object is attacked.

In some embodiments, the terminal 1800 may optionally include: a peripheral device interface 1803 and at least one peripheral device. The processor 1801, the memory 1802, and the peripheral device interface 1803 may be connected by a bus or a signal line. Each peripheral device may be connected to the peripheral device interface 1803 by using a bus, a signal cable, or a circuit board. In one embodiment, the peripheral device includes at least one of a radio frequency circuit 1804, a display screen 1805, a camera 1806, an audio circuit 1807, a positioning component 1808, and a power supply 1809.

A person skilled in the art may understand that the structure shown in FIG. 18 does not constitute a limitation to the terminal 1800, and the terminal may include more or fewer components than those shown in the figure, or some components may be combined, or a different component arrangement may be used.

In an example embodiment, a computer-readable storage medium is further provided, the storage medium storing at least one instruction, at least one program, a code set, or an instruction set, the at least one instruction, the at least one program, the code set, or the instruction set, when executed by the processor, implementing the method for prompting that a virtual object is attacked.

Optionally, the computer-readable storage medium may include: a read-only memory (ROM), a random access memory (RAM), a solid state drive (SSD), an optical disc, or the like. The RAM may include a resistance random access memory (ReRAM) and a dynamic random access memory (DRAM).

In an example embodiment, a computer program product is further provided, the computer program product, when executed by the processor, implementing the method for prompting that a virtual object is attacked.

It is to be understood that "a plurality of" mentioned in the specification means two or more. "And/or" describes an association relationship for describing associated objects and represents that three relationships may exist. For example, A and/or B may represent the following three cases: Only A exists, both A and B exist, and only B exists. The character "/" in this specification generally indicates an "or" relationship between the associated objects. In addition, the step numbers described in this specification merely exemplarily show a possible execution sequence of the steps. In some other embodiments, the steps may not be performed according to the number sequence. For example, two steps with different numbers may be performed simultaneously, or two steps with different numbers may be performed according to a sequence contrary to the sequence shown in the figure. This is not limited in the embodiments of this application.

The foregoing descriptions are merely exemplary embodiments of this application, but are not intended to limit this application. Any modification, equivalent replacement, or improvement made within the spirit and principle of this application shall fall within the protection scope of this application.

What is claimed is:

1. A method for prompting that a virtual object is attacked, the method comprising:
   displaying a user interface (UI) comprising a target virtual object within a virtual environment;
   obtaining a being-attacked direction of the target virtual object that is a direction from which the target virtual object is attacked; and
   causing a virtual weapon of the target virtual object to jitter in a direction based on the being-attacked direction.

2. The method according to claim 1, wherein the direction of the jitter is a deviation of the virtual weapon from an initial position.

3. The method according to claim 2, wherein the direction of the jitter is opposite from the being-attacked direction.

4. The method according to claim 1, further comprising:
   displaying being-attacked direction prompt information in a display position of the UI that visually indicates the being-attacked direction.

5. The method according to claim 4, wherein the being-attacked direction prompt information comprises an arc-shaped UI element; and the displaying further comprises:
   determining the display position of the arc-shaped UI element according to the being-attacked direction; and
   a position of the arc-shaped UI element relative to a center matching a position of the target virtual object relative to an enemy virtual object that launches the attack.

6. The method according to claim 5, wherein the center overlaps with a central point of a front sight of a virtual weapon held by the target virtual object.

7. The method according to claim 4, wherein after the obtaining the being-attacked direction, the method further comprises:
   obtaining being-attacked times corresponding to the being-attacked direction, the being-attacked times are a quantity of times that the target virtual object is attacked in the being-attacked direction; and
   displaying being-attacked times prompt information in the UI, the being-attacked times prompt information is used for indicating the being-attacked times.

8. The method according to claim 4, wherein a display style of the being-attacked direction prompt information is related to at least one type of the following information: a being-attacked distance, a being-attacked time, being-attacked times, or a being-attacked damage.

9. The method according to claim 4, wherein after the displaying the being-attacked direction prompt information in the UI according to the display position, the method comprises:
   canceling the display of the being-attacked direction prompt information in the UI when a display duration of the being-attacked direction prompt information reaches a preset duration, and the target virtual object is subject to no other attacks from the being-attacked direction within the preset duration.

10. A method for prompting that a virtual object is attacked, applicable to a mobile terminal, the method comprising:
    displaying a user interface (UI), the UI comprising a target virtual object located in a virtual environment;
    obtaining a being-attacked direction and a being-attacked times of the target virtual object, wherein the being-attacked direction is a direction in which the target virtual object is attacked and the being-attacked times is a number of times the target virtual object is attacked;

displaying being-attacked direction prompt information in a display position of the UI that visually indicates the being-attacked direction and the being-attacked times.

11. The method according to claim 10, wherein a display style of the (Original) being-attacked direction prompt information is based on at least one of: a being-attacked distance, a being-attacked time, being-attacked times, or a being-attacked damage.

12. The method according to claim 10, wherein the being-attacked direction prompt information comprises an arc-shaped UI element; and the displaying further comprises:

determining the display position of the arc-shaped UI element according to the being-attacked direction; and a position of the arc-shaped UI element relative to a center matching a position of the target virtual object relative to an enemy virtual object that launches the attack.

13. The method according to claim 12, wherein the center overlaps with a central point of a front sight of a virtual weapon held by the target virtual object.

14. The method according to claim 10, wherein a display style of the being-attacked direction prompt information is related to at least one type of the following information: a being-attacked distance, a being-attacked time, being-attacked times, or a being-attacked damage.

15. The method according to claim 10, wherein after the displaying the being-attacked direction prompt information in the UI according to the display position, the method comprises:

canceling the display of the being-attacked direction prompt information in the UI when a display duration of the being-attacked direction prompt information reaches a preset duration, and the target virtual object is subject to no other attacks from the being-attacked direction within the preset duration.

16. An apparatus for prompting that a virtual object is attacked, comprising:

an interface display module, configured to display a user interface (UI), the UI comprising a target virtual object located in a virtual environment;

a direction obtaining module, configured to obtain a being-attacked direction of the target virtual object, the being-attacked direction is a direction in which the target virtual object is attacked;

a position determination module, configured to determine a display position of being-attacked direction prompt information according to the being-attacked direction, the being-attacked direction prompt information is used for indicating the being-attacked direction; and an information display module, configured to display the being-attacked direction prompt information in the UI according to the display position and based on a being-attacked distance, a being-attacked time, being-attacked times, or a being-attacked damage.

17. The apparatus of claim 16, wherein the being-attacked direction prompt information comprises an arc-shaped UI element and a position of the arc-shaped UI element is relative to a center matching a position of the target virtual object relative to an enemy virtual object that launches the attack.

18. The apparatus of claim 16, wherein after displaying the being-attacked direction prompt information in the UI according to the display position, information display module is configured to cancel the display of the being-attacked direction prompt information in the UI when a display duration of the being-attacked direction prompt information reaches a preset duration, and the target virtual object is subject to no other attacks from the being-attacked direction within the preset duration.

19. The apparatus of claim 16, further comprising:

a parameter determination module, configured to determine, according to the being-attacked direction, a jitter parameter of a virtual weapon held by the target virtual object; and a jitter control module, configured to cause, according to the jitter parameter, a jitter of the virtual weapon in a direction opposite to the being-attacked direction.

20. The apparatus of claim 19, wherein the jitter comprises a jitter direction and a jitter angle, the jitter direction being a direction in which the virtual weapon deviates from an initial position and the jitter angle being an angle at which the virtual weapon deviates from the initial position.

* * * * *

UNITED STATES PATENT AND TRADEMARK OFFICE
CERTIFICATE OF CORRECTION

PATENT NO. : 12,128,312 B2
APPLICATION NO. : 18/153048
DATED : October 29, 2024
INVENTOR(S) : Zhi Hong Liu It is certified that error appears in the above-identified patent and that said Letters Patent is hereby corrected as shown below:

In the Claims

In Column 19, Line 7, delete "(Original)".

Signed and Sealed this
Twenty-sixth Day of November, 2024

Katherine Kelly Vidal
*Director of the United States Patent and Trademark Office*